United States Patent
Kirby et al.

(10) Patent No.: US 11,414,356 B2
(45) Date of Patent: Aug. 16, 2022

(54) DENSE ENVIRONMENTAL BARRIER COATING COMPOSITIONS

(71) Applicant: General Electric Company, Schenectady, NY (US)

(72) Inventors: Glen Harold Kirby, Liberty Township, OH (US); Julin Wan, Rexford, NY (US); Sivakumar Ramasamy, Mason, OH (US)

(73) Assignee: General Electric Company, Schenectady, NY (US)

( * ) Notice: Subject to any disclaimer, the term of this patent is extended or adjusted under 35 U.S.C. 154(b) by 509 days.

(21) Appl. No.: 15/744,480

(22) PCT Filed: Aug. 17, 2016

(86) PCT No.: PCT/US2016/047274
§ 371 (c)(1),
(2) Date: Jan. 12, 2018

(87) PCT Pub. No.: WO2017/031163
PCT Pub. Date: Feb. 23, 2017

(65) Prior Publication Data
US 2018/0370862 A1    Dec. 27, 2018

Related U.S. Application Data

(60) Provisional application No. 62/206,319, filed on Aug. 18, 2015, provisional application No. 62/206,318, filed on Aug. 18, 2015.

(51) Int. Cl.
*C04B 41/50*     (2006.01)
*C04B 41/87*     (2006.01)
(Continued)

(52) U.S. Cl.
CPC ........ *C04B 41/5045* (2013.01); *C04B 41/009* (2013.01); *C04B 41/4527* (2013.01);
(Continued)

(58) Field of Classification Search
None
See application file for complete search history.

(56) References Cited

U.S. PATENT DOCUMENTS 5,080,977 A    1/1992  Zaplatynsky
6,325,710 B1   12/2001 Mikus
(Continued)

FOREIGN PATENT DOCUMENTS

EP    1050522 A1    11/2000
EP    1 188 731 A2   3/2002
(Continued)

OTHER PUBLICATIONS

International Search Report and Written Opinion issued in connection with corresponding PCT Application No. PCT/US2016/047274 dated Oct. 21, 2016.
(Continued)

*Primary Examiner* — David Sample
(74) *Attorney, Agent, or Firm* — Dority & Manning, P.A.

(57) ABSTRACT

A coated substrate is provided that includes an environmental barrier coating on (e.g., directly on) a surface of a substrate (e.g., a ceramic matrix composite). The environmental barrier coating can include a barrier layer having a refractory material phase and a silicon-containing glass phase. The silicon-containing glass phase may be a continuous phase within the barrier layer (e.g., a breathable grain boundary of the barrier layer), or may be a plurality of discontinuous layers dispersed throughout the refractory material phase. The refractory material phase can include a rare earth silicate material having a rare earth component at
(Continued)

a first atomic percent, while the silicon-containing glass phase comprises the rare earth component at a second atomic percent that is less than the first atomic percent. Methods are also provided for forming a barrier layer on a substrate.

15 Claims, 2 Drawing Sheets

(51) Int. Cl.
| | |
|---|---|
| C04B 41/00 | (2006.01) |
| C04B 41/45 | (2006.01) |
| F01D 5/28 | (2006.01) |
| C23C 4/11 | (2016.01) |
| C23C 4/134 | (2016.01) |
| C23C 4/18 | (2006.01) |
| C23C 28/04 | (2006.01) |
| C04B 41/52 | (2006.01) |
| C23C 4/10 | (2016.01) |
| C04B 41/89 | (2006.01) |
| C23C 24/08 | (2006.01) |
| C23C 4/067 | (2016.01) |

(52) U.S. Cl.
CPC .......... $C04B\ 41/5024$ (2013.01); $C04B\ 41/52$ (2013.01); $C04B\ 41/87$ (2013.01); $C04B\ 41/89$ (2013.01); $C23C\ 4/067$ (2016.01); $C23C\ 4/10$ (2013.01); $C23C\ 4/11$ (2016.01); $C23C\ 4/134$ (2016.01); $C23C\ 4/18$ (2013.01); $C23C\ 24/08$ (2013.01); $C23C\ 28/042$ (2013.01); $C23C\ 28/044$ (2013.01); $F01D\ 5/288$ (2013.01); $F05D\ 2220/323$ (2013.01); $F05D\ 2230/312$ (2013.01); $F05D\ 2240/11$ (2013.01); $F05D\ 2240/128$ (2013.01); $F05D\ 2240/15$ (2013.01); $F05D\ 2240/24$ (2013.01); $F05D\ 2240/35$ (2013.01); $F05D\ 2300/13$ (2013.01); $F05D\ 2300/15$ (2013.01); $F05D\ 2300/2102$ (2013.01); $F05D\ 2300/222$ (2013.01); $F05D\ 2300/6033$ (2013.01); $F05D\ 2300/611$ (2013.01); $Y02T\ 50/60$ (2013.01)

(56) References Cited

U.S. PATENT DOCUMENTS

| | | | |
|---|---|---|---|
| 8,168,259 | B2 | 5/2012 | Sarrafi-Nour et al. |
| 9,212,100 | B2 | 12/2015 | Kirby et al. |
| 9,428,650 | B2 | 8/2016 | Meschter et al. |
| 2010/0080984 | A1* | 4/2010 | Lee .......... C04B 41/89 |
| | | | 428/334 |
| 2011/0027484 | A1 | 2/2011 | Kirby et al. |
| 2011/0027578 | A1* | 2/2011 | Kirby .......... C04B 41/009 |
| | | | 428/336 |
| 2011/0256411 | A1* | 10/2011 | Courcot .......... C04B 41/52 |
| | | | 428/446 |
| 2012/0077004 | A1 | 3/2012 | Kirby et al. |
| 2018/0079687 | A1* | 3/2018 | Kirby .......... C09D 1/00 |

FOREIGN PATENT DOCUMENTS

| | | | |
|---|---|---|---|
| EP | 1 666 626 | A1 | 6/2006 |
| EP | 2 287 134 | A2 | 2/2011 |
| EP | 2 289 863 | A2 | 3/2011 |
| EP | 2 918 698 | A1 | 9/2015 |
| JP | 2006/143553 | A | 6/2006 |
| JP | 2008/208374 | A | 9/2008 |
| JP | 2011/046596 | A | 3/2011 |

OTHER PUBLICATIONS

International Preliminary Report on Patentability issued in connection with corresponding PCT Application No. PCT/US2016/047274 dated Feb. 20, 2018.
Kirby, G.H., et al., Dense environmental barrier coating compositions, GE co-pending U.S. Appl. No. 62/206,319, filed on Aug. 18, 2015.
Kirby, G.H., et al., Dense environmental barrier coating compositions, GE co-pending U.S. Appl. No. 62/206,318, filed on Aug. 18, 2015.
Machine Translated Japanese Office Action Corresponding to Application No. 2018507674 dated Sep. 8, 2020.

* cited by examiner

DENSE ENVIRONMENTAL BARRIER COATING COMPOSITIONS

PRIORITY INFORMATION

The present application claims priority to U.S. Provisional Patent Application Ser. No. 62/206,318 titled "Dense Environmental Barrier Coating Compositions" of Kirby, et al. filed on Aug. 18, 2015, and to U.S. Provisional Patent Application Ser. No. 62/206,319 titled "Dense Environmental Barrier Coating Compositions" of Kirby, et al. filed on Aug. 18, 2015, the disclosures of which are incorporated by reference herein.

FIELD OF THE INVENTION

Embodiments of the present invention generally relate to environmental barrier coatings for ceramic components, along with methods of making the same.

BACKGROUND OF THE INVENTION

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. Still, with many hot gas path components constructed from super alloys, thermal barrier coatings (TBCs) can be utilized to insulate the components and can sustain an appreciable temperature difference between the load-bearing alloys and the coating surface, thus limiting the thermal exposure of the structural component.

While superalloys have found wide use for components used throughout gas turbine engines, and especially in the higher temperature sections, alternative lighter-weight substrate materials have been proposed, such as ceramic matrix composite (CMC) materials. CMC and monolithic ceramic components can be coated with environmental barrier coatings (EBCs) to protect them from the harsh environment of high temperature engine sections. EBCs can provide a dense, hermetic seal against the corrosive gases in the hot combustion environment.

Silicon carbide and silicon nitride ceramics undergo oxidation in dry, high temperature environments. This oxidation produces a passive, silicon oxide scale on the surface of the material. In moist, high temperature environments containing water vapor, such as a turbine engine, both oxidation and recession occurs due to the formation of a passive silicon oxide scale and subsequent conversion of the silicon oxide to gaseous silicon hydroxide. To prevent recession in moist, high temperature environments, environmental barrier coatings (EBC's) are deposited onto silicon carbide and silicon nitride materials.

Currently, EBC materials are made out of oxides such as mullite, celsian-phase barium strontium aluminosilicate (BSAS), and most recently rare earth silicate compounds. These materials seal out water vapor, preventing it from reaching the silicon oxide scale on the silicon carbide or silicon nitride surface, thereby preventing recession. Such materials cannot prevent oxygen penetration, however, which results in oxidation of the underlying substrate. Oxidation of the substrate yields a passive silicon oxide scale, along with the release of carbonaceous or nitrogen based gases (e.g., nitrous oxide gas) for silicon carbide- and silicon nitride-based substrates, respectively. The carbonaceous (i.e., $CO$, $CO_2$) or nitrogen-based gases (i.e., $N_2$, $NO$, $NO_2$, etc.) oxide gases cannot escape out through the dense EBC and thus, blisters form. The use of a silicon bond coat has been the solution to this blistering problem to date. The silicon bond coat provides a layer that oxidizes (forming a passive silicon oxide layer beneath the EBC) without liberating a gaseous by-product. However, the presence of a silicon bond coat limits the upper temperature of operation for the EBC because the melting point of silicon metal is relatively low compared to the oxides.

As such, it is desirable to eliminate the use of a silicon bond coat in the EBC to achieve a higher operational temperature limit for the EBC.

BRIEF DESCRIPTION OF THE INVENTION

Aspects and advantages of the invention will be set forth in part in the following description, or may be obvious from the description, or may be learned through practice of the invention.

A coated substrate is generally provided. In one embodiment, the coated substrate includes an environmental barrier coating on (e.g., directly on) a surface of a substrate (e.g., a ceramic matrix composite). The environmental barrier coating comprises a barrier layer having a refractory material phase and a silicon-containing glass phase. The silicon-containing glass phase may be a continuous phase within the barrier layer (e.g., a breathable grain boundary of the barrier layer), or may be a plurality of discontinuous layers dispersed throughout the refractory material phase.

In one particular embodiment, the refractory material phase includes a rare earth silicate material having a rare earth component at a first atomic percent, while the silicon-containing glass phase comprises the rare earth component at a second atomic percent that is less than the first atomic percent.

Methods are also generally provided for forming a barrier layer on a substrate, with the barrier layer including a refractory material phase and a silicon-containing glass phase.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

Figure 1:
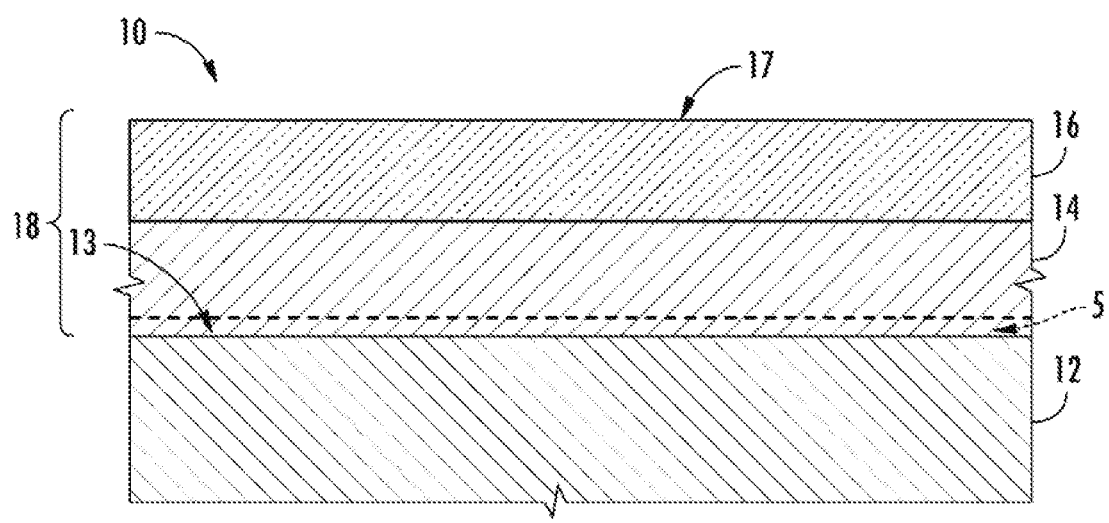
FIG. 1 is a schematic cross sectional view of an exemplary coated substrate in accordance with one embodiment disclosed herein.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. As used herein, "Ln" refers to a rare earth element or a mixture of rare earth elements. More specifically, the "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof (or the appropriate salt thereof). As used herein, the term "alkaline earth metals" refers to beryllium (Be), magnesium (Mg), calcium (Ca), strontium (Sr), barium (Ba), and radium (Ra), occupying Group IIA (2) of the periodic table (or the appropriate salt thereof).

Environmental barrier coatings are generally provided on the surface of the substrate, with the environmental barrier coating including a barrier layer having a breathable silicon-containing glass phase. For example, the barrier layer can include a refractory material phase and a silicon-containing glass phase, with the refractory material phase including a rare earth silicate material The silicon-containing glass phase is "breathable" in the sense that they increase the transport (permeability and/or diffusion rate) of carbonaceous, nitrogen, or nitrous gas byproducts through the EBC layer, which can lower any gaseous pressure within the EBC to help inhibit blistering and/or delamination of the EBC. As such, the silicon-containing glass phase is generally an amorphous, non-crystalline material with creep behavior that allows gas bubbles to transport therethrough, as explained in greater detail below.

In one embodiment, the presence of such breathable silicon-containing glass phases can eliminate any need for a silicon bond coat, allowing higher temperature operation of the EBC. That is, in one particular embodiment, the EBC barrier coating can be directly on the surface of the substrate (i.e., without any intermediate bond coat). The resulting EBC allows for the use of advanced CMC/EBC material systems that can operate at CMC surface temperatures exceeding about 2500° F. (about 1371° C.) and up to about 2700° F. (about 1482° C.), and possibly exceeding about 2700° F. (about 1482° C.) for short durations with EBC surface temperatures up to about 3400° F. (about 1871° C.).

One way to make the barrier layer with breathable silicon-containing glass phase is by over-doping rare earth silicate materials such that a secondary breathable silicon-containing glass phase emerges in the precursor powder as a glass. It is noted that, at a lesser doping level, only single phase, doped rare earth silicate would be present. The powder mix is then applied to form the coating with doped rare earth silicate plus continuous, breathable silicon-containing glass phase. Another way to make the barrier layer with breathable silicon-containing glass phase is by mixing a glass powder of breathable silicon-containing glass phase composition with a powder of refractory material suitable for environmental barrier coating applications such as rare earth silicate, mullite, BSAS, zirconia, hafnia, stabilized (tetragonal or cubic) zirconia, stabilized (tetragonal or cubic) hafnia, zircon ($ZrSiO_4$), hafnon ($HfSiO_4$), rare earth zirconate, rare earth hafnate, rare earth gallate, etc. Yet another way to make the barrier layer with breathable silicon-containing glass phase is by depositing the glass composition directly on the substrate as a coating layer, then applying a porous layer of material suitable for environmental barrier coating applications on top of the glass layer.

In one embodiment, the breathable silicon-containing glass phase yields enhanced permeability of carbonaceous and/or nitrogen based gases (e.g., nitrogen, and/or nitrous gases) because these gases are released to build up pressure beneath the coating layer as the substrate is oxidized. Once the pressure is built-up to a sufficient level, the gas is forced through the secondary breathable silicon-containing glass phase. In such case, the secondary breathable silicon-containing glass phase behaves like a viscous phase that gas bubbles may transport through due to the build in pressure. The coating layer remains largely hermetic to water vapor on the outside of the coating, however, because the external pressure of the water vapor is too low for it to be forced the other direction through the breathable silicon-containing glass phase. In such case, materials that decrease the viscosity of the secondary breathable silicon-containing glass phase may improve its functionality (e.g. boron oxide). In contrast, elements that increase the viscosity of the secondary breathable silicon-containing glass phase may destroy its functionality. Such materials are those that would raise the viscosity of the glass (e.g. oxides of aluminum, niobium, and tantalum).

In another embodiment, the breathable silicon-containing glass phase may be a glass that exhibits high solubility for carbonaceous, nitrogen, and/or nitrous gases. In such case, materials in the glass phase that result in a glass of high permeability of carbonaceous gas may include those with cations that tend to form more stable carbonates than hydroxides (such as those described for rare earth silicate doping and over-doping). Materials with cations that form stable hydroxides but do not form carbonates (e.g., aluminum) may be a poor choice to be a part of the secondary breathable silicon-containing glass phase glass composition.

Over-doping refers to doping the rare earth silicate material in excess at the rare earth site (e.g., with a dopant that includes an alkali metal cation, $Cu^{1+}$, $Au^{1+}$, $Ag^{1+}$, a noble metal cation, an alkaline earth metal cation, $Cu^{1+}$, $Ni^{2+}$, $Fe^{2+}$, $Mn^{2+}$, $Zn^{2+}$, $Sn^{2+}$, or a mixture thereof) to form the secondary breathable silicon-containing glass phase. As such, the rare earth component has a lesser atomic percentage in the resulting silicon-containing glass phase than in the rare earth silicate material of the refractory material phase. Additionally, the dopant has a greater atomic percentage in the resulting silicon-containing glass phase than in the rare earth silicate material of the refractory material phase.

Doped rare earth silicate may also enhance the net breathability of a layer comprised of both continuous, breathable silicon-containing glass phase and the refractory material phase including a rare earth silicate material (e.g., a doped rare earth silicate). As stated, doping is accomplished chemically via substitution on the rare earth "site" of the compound with any element with oxidation state of +1 or +2. Alkaline earth elements, with +2 oxidation state, are particularly useful for this task. Partial substitution of the +3 oxidation state rare earth with a lower oxidation state element results in oxygen vacancies in the material. This network of oxygen vacancies, combined with open-nature of the rare earth silicate monoclinic structure, may enhance the diffusion of carbonaceous, nitrogen, and/or nitrous gas through the two-phase layer.

In each case described above, the barrier layer is a dense layer that allows for venting of the carbonaceous and nitrogen-based gases while also preventing steam from the combustion environment from reaching the substrate. The coating may be hermetic to steam (no steam gets to the substrate), or it may only allow a low flow rate of steam to the substrate via a slow molecular diffusion process. It is also possible that the flow of carbonaceous and/or nitrogen-based gases out through the layer may disrupt or slow transport of water vapor from going through the EBC to attack the underlying substrate. In certain embodiments, the barrier layer has a porosity that is about 10% or less.

In the approach where rare earth silicate materials are over-doped to form a two phase mixture (breathable silicon-containing glass phase plus refractory rare earth silicate), ytterbium, thulium, and lutetium silicate rare earths or combinations thereof are particularly useful, and perhaps preferred, as compared to all of the other rare earths. All of the other rare earths, when over-doped, particularly with alkaline earths, tend to form gas impermeable phases instead of gas permeable glass. For example, alkaline earth substitution on the ytterbium site of $Yb_2Si_2O_7$ can produce a two phase mixture of gas permeable glass phase and a refractory phase of doped $Yb_2Si_2O_7$, however, alkaline earth substitution on the yttrium site of $Y_2Si_2O_7$ produces a two phase mixture of gas impermeable apatite and doped $Y_2Si_2O_7$. However, this does not exclude the possibility of forming a gas permeable glass phase combined with rare earth silicates other than ytterbium, thulium, or lutetium silicates.

The refractory material phase of the barrier layer includes, in one particular embodiment, a rare earth silicate material (e.g., a monosilicate compound, a disilicate compound, or a mixture thereof). In such an embodiment, the silicon-containing glass phase comprises a rare earth silicate glass (e.g., a doped rare earth silicate glass, such as Ca—Yb-silicate glass).

In one embodiment, a monosilicate compound is combined with a breathable silicon-containing glass phase. For example, the monosilicate compound is, in one embodiment, $Ln_2SiO_5$ and/or $Ln_2SiO_5$ doped at the Ln site with a dopant (e.g., an alkali metal cation, $Cu^{1+}$, $Au^{1+}$, $Ag^{1+}$, a noble metal cation, an alkaline earth metal cation, $Cu^{2+}$, $Ni^{2+}$, $Fe^{2+}$, $Mn^{2+}$, $Zn^{2+}$, $Sn^{2+}$, or a mixture thereof). In such an embodiment, the refractory material phase can include a monosilicate compound as the rare earth silicate material, with the monosilicate compound having the formula:

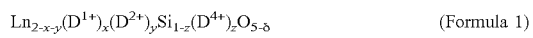  (Formula 1)

where

Ln a rare earth element or a mixture of rare earth elements;

$D^{1+}$ is an alkali metal cation, $Cu^{1+}$, $Au^{1+}$, $Ag^{1+}$, a noble metal cation, or a mixture thereof;

$D^{2+}$ is an alkaline earth metal cation (such as $Mg^{2+}$, $Ca^{2+}$, $Sr^{2+}$, $Ba^{2+}$, or a mixture thereof), $Cu^{2+}$, $Ni^{2+}$, $Fe^{2+}$, $Mn^{2+}$, $Zn^{2+}$, $Sn^{2+}$, or a mixture thereof;

$0 \leq x \leq 1$ (e.g., $0 \leq x \leq 0.1$);
$0 \leq y \leq 1$ (e.g., $0 \leq y \leq 0.1$);
$D^{4+}$ is $Sn^{4+}$, $Ge^{4+}$, $Hf^{4+}$, $Zr^{4+}$, $Ti^{4+}$, $Ce^{4+}$, or a mixture thereof (e.g., in one m r particular embodiment, $Ge^{4+}$, $Ti^{4+}$, or a mixture thereof);
$0 \leq z \leq 1$ (e.g., $0 \leq z \leq 0.1$);
$0 \leq \delta \leq 0.2$; and
$0 < (x+y+z)$;
with the conditions:
if $y > 0$ and $D^{2+}$ is an alkaline earth metal cation, then Ln is Yb, Lu, Tm or a mixture thereof;
if not both $y > 0$ and $D^{2+}$ is an alkaline earth metal cation, then Ln is any Ln.

In another embodiment, a disilicate compound is combined with a breathable silicon-containing glass phase. For example, the disilicate compound is, in one embodiment, $Ln_2Si_2O_7$ and/or $Ln_2Si_2O_7$ doped at the Ln site with a dopant (e.g., an alkali metal cation, $Cu^{1+}$, $Au^{1+}$, $Ag^{1+}$, a noble metal cation, an alkaline earth metal cation, $Cu^{2+}$, $Ni^{2+}$, $Fe^{2+}$, $Mn^{2+}$, $Zn^{2+}$, $Sn^{2+}$, or a mixture thereof). In such an embodiment, the refractory material phase can include a disilicate compound as the rare earth silicate material, with the disilicate compound having the formula:

$$Ln_{2-x-y}(D^{1+})_x(D^{2+})_ySi_{2-z}(D^{4+})_zO_{7-\delta}$$  (Formula 2)

where

Ln a rare earth element or a mixture of rare earth elements;

$D^{1+}$ is an alkali metal cation, $Cu^{1+}$, $Au^{1+}$, $Ag^{1+}$, a noble metal cation, or a mixture thereof;

$D^{2+}$ is an alkaline earth metal cation (such as $Mg^{2+}$, $Ca^{2+}$, $Sr^{2+}$, $Ba^{2+}$, or a mixture thereof), $Cu^{2+}$, $Ni^{2+}$, $Fe^{2+}$, $Mn^{2+}$, $Zn^{2+}$, $Sn^{2+}$, or a mixture thereof;

$0 \leq x \leq 1$ (e.g., $0 \leq x \leq 0.1$);
$0 \leq y \leq 1$ (e.g., $0 \leq y \leq 0.1$);
$D^{4+}$ is $Sn^{4+}$, $Ge^{4+}$, $Hf^{4+}$, $Zr^{4+}$, $Ti^{4+}$, $Ce^{4+}$, or a mixture thereof (e.g., in one particular embodiment, $Ge^{4+}$, $Ti^{4+}$, or a mixture thereof);
$0 \leq z \leq 1$ (e.g., $0 \leq z \leq 0.1$);
$0 \leq \delta \leq 0.2$; and
$0 < (x+y+z)$,
with the conditions:
if $y > 0$ and $D^{2+}$ is an alkaline earth metal cation, then Ln is Yb, Lu, Tm or a mixture thereof; and
if not both $y > 0$ and $D^{2+}$ is an alkaline earth metal cation, then Ln is any Ln.

In one embodiment, $0 < (x+y+z) \leq 1$, such as $0 < (x+y+z) \leq 0.1$. In one particular embodiment, $0 < (x+y) \leq 1$, such as $0 < (x+y) \leq 0.1$. One exemplary monosilicate is $Yb_{2-x}Ca_xSiO_{5-\delta}$ where $0.05 \leq x \leq 0.1$ and $0 < \delta \leq 0.2$.

In one embodiment, $0 < (x+y+z) \leq 1$, such as $0 < (x+y+z) \leq 0.1$. In one particular embodiment, $0 < (x+y) \leq 1$, such as $0 < (x+y) \leq 0.1$. One exemplary disilicate is $Yb_{2-x}Ca_xSi_2O_{7-\delta}$ where $0.05 \leq x \leq 0.1$ and $0 < \delta \leq 0.2$.

As stated, this doped silicate layer (e.g., doped monosilicate compound and/or doped disilicate compound) may also be combined with a permeable secondary phase formed by an excess of doping that results in the formation of the secondary phase that is continuous and breathable.

In another embodiment, the breathable silicon-containing glass phase is directly on top of the substrate and a single or plurality of combinations of porous $Ln_2Si_2O_7$ and $Ln_2SiO_5$ layers are on the breathable silicon-containing glass phase layer. In one embodiment, the doped disilicate can also be combined with a permeable secondary phase.

Many of the compounds of Formula 1 or 2 have monoclinic rare earth silicates that may have a thermal expansion nearly equivalent to a SiC CMC or a higher thermal expansion than a SiC CMC. If higher than a SiC, however, vertically cracked layers comprised these materials can still offer some resistance to high T steam, particularly if there are additional layers underneath that are crack free to act as a hermetic layer.

In addition, many of the compounds of Formula 1 or 2 offer some protection from molten dust, particularly dirt or sand comprised of alkaline earth aluminosilicates. For additional protection, a porous or vertically cracked layer of rare earth silicate with rare earth of Y, Gd, Nd, Er, and Sm or combinations thereof can be used on top of the barrier layer. A plurality of these layers can also be used. These can form protective apatite layers when they react with molten dust (i.e., once the apatite forms due to reaction with molten dust, the remaining molten dust has difficulty penetrating the apatite layer).

Such a coating can be included as a stand-along coating layer (with or without additional outer layers present) on a substrate, or as a first layer of an EBC system directly on a substrate.

FIG. 1 shows a coating component 10 formed from a substrate 12 defining a surface 13 having an environmental barrier coating (EBC) 18 thereon. The EBC 18 includes a barrier layer 14 described above that includes a breathable silicon-containing glass phase 5 therein (e.g., having the compound of Formula 1 and/or 2 above). In the embodiment shown, the breathable silicon-containing glass phase 5 is directly on the surface 13 of the substrate 12 (i.e., without any bond coating present). In this embodiment, the breathable silicon-containing glass phase 5 may be a continuous phase within the barrier layer 14, such as a grain boundary phase. For example, the continuous, breathable silicon-containing glass phase may define as little as about 10% of the volume of the barrier layer or as much as about 65% of the volume of the barrier layer. However, in other embodiments, the breathable silicon-containing glass phase 5 may be a discontinuous phase (e.g., a plurality of dispersed glass phases) within the barrier layer 14. For example, the discontinuous, breathable silicon-containing glass phase may define as little as about 10% of the volume of the barrier layer or as much as about 65% of the volume of the barrier layer.

Although shown as forming only a portion of the barrier layer 14, the breathable silicon-containing glass phase 5 can form and make-up substantially all of the barrier layer 14. For example, the barrier layer 14 can have a thickness of about 130 µm or less (e.g., about 50 µm to about 105 µm), with the breathable silicon-containing glass phase 5 defining about 10% to less than 100% of the thickness of the barrier layer 14. In such an embodiment, the breathable silicon-containing glass phase 5 can define about 10% to about 100% of the total volume of the barrier layer 14 (e.g., about 10% to about 65% of the total volume). For example, the breathable silicon-containing glass phase 5 can have a thickness of about 130 µm or less (e.g., about 50 µm to about 105 µm). For additional thickness on the breathable silicon-containing glass phase 5, the barrier layer 14 can include a refractory material phase that includes a plurality of microcracks extending from the breathable silicon-containing glass phase 5 to the opposite surface of the barrier layer 14 to provide breathable, porous thickness. Such a porous material can serve to protect from harmful particles (e.g., CMAS) and/or heat to define a protection layer for the underlying breathable silicon-containing glass phase 5.

The substrate 12 (e.g., a CMC component) may oxidize, particularly on its surface 13, over time. During this oxidation, gas is released in the form of CO, $CO_2$, $N_2$, NO, $NO_2$, or a mixture thereof. As it oxidizes, a $SiO/SiO_2$ layer (sometimes referred to as "silicon oxide scale" or "silica scale") is formed on the surface 13 and into the substrate 12. Typically, it is desired that this silica scale remain amorphous, as its crystallization could lead to shedding of the overlying coatings from the substrate 12. However, without wishing to be bound by any particular theory, it is believed that if the silica scale crystallizes and forms cracks in the surface 13, the breathable silicon-containing glass phase 5 of the barrier layer 14 may migrate into the cracks to fill them and prevent coating to shed.

Furthermore, the silica scale may partially dissolve into the breathable silicon-containing glass phase. This dissolution strengthens the chemical bond with the barrier layer 14. Also, this may raise the silicon content in the silicon containing glass phase without changing the functionality of the layer.

As stated above, the substrate 12 is formed from a CMC material (e.g., a silicon based, non-oxide ceramic matrix composite). As used herein, "CMCs" refers to silicon-containing, or oxide-oxide, matrix and reinforcing materials. Some examples of CMCs acceptable for use herein can include, but are not limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMCs with silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. These oxide-oxide composites are described below.

Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates. The coating system described herein can be used to protect oxide-oxide CMC's from high temperature steam recession. However, one particular advantage of this system is for silicon-based non-oxide CMCs that evolve gas upon oxidation. In such systems, a silicon bond coat is typically used so that it oxidizes instead of the underlying substrate. In this manner, gas is not released from the silicon bond coat as it is oxidized, and it thereby promotes a stable foundation for refractory steam hermetic and steam recession resistant layers that are deposited on the bond coat. Unfortunately, silicon bond coats melt at temperatures of about 1414° C. or less (depending on the purity of the silicon). The gas breathable technology described herein allows for a coating to be applied directly to silicon-based non oxide CMCs and monolithic ceramics. By eliminating the bond coat, the CMC and coating can be taken to higher temperature without a bond coat that melts.

As used herein, "monolithic ceramics" refers to materials without fiber reinforcement. Herein, CMCs and monolithic ceramics are collectively referred to as "ceramics."

The EBC 18 is particularly suitable for use on ceramic substrate components found in high temperature environments, such as those present in gas turbine engines, for example, combustor components, turbine blades, shrouds, nozzles, heat shields, and vanes. In the embodiment shown in FIG. 1, at least one outer coating 16 is shown on the barrier layer 14 to define an external surface 17. The outer coating 16 can be any number of layers of EBC materials, TBC materials, or combinations thereof. Although shown as a single coating in FIG. 1, the outer coating 16 can be formed from multiple layers of materials selected from typical EBC or TBC layer chemistries such as rare earth silicates (mono- and di-silicates), mullite, B SAS, hafnia, zirconia, stabilized hafnia, stabilized zirconia, rare earth hafnates, rare earth zirconates, rare earth gallates.

As stated, the coated substrate 10 can be utilized as a turbine component for a gas turbine. In particular, the turbine component can be a CMC component positioned within a hot gas flow path of the gas turbine such that the coating forms an environmental barrier coating on the component to protect the component within the gas turbine when exposed to the hot gas flow path.

Figure 2:
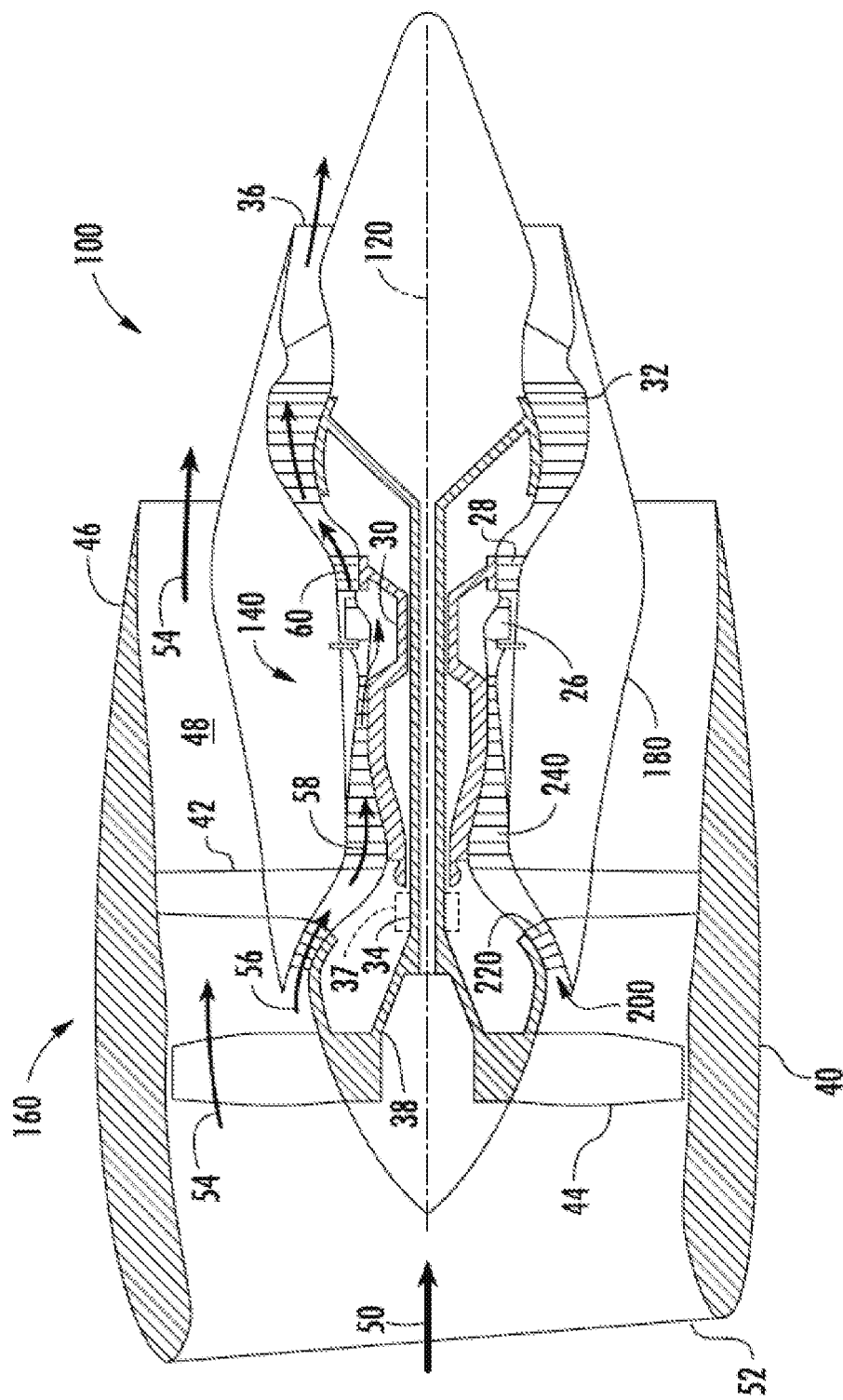
FIG. 2 is a schematic cross-sectional view of one embodiment of a gas turbine engine that may be utilized with an aircraft in accordance with aspects of the present subject matter.

FIG. 2 illustrates a cross-sectional view of one embodiment of a gas turbine engine 100 that may be utilized within an aircraft in accordance with aspects of the present subject matter, with the engine 100 being shown having a longitudinal or axial centerline axis 120 extending therethrough for reference purposes. In general, the engine 100 may include a core gas turbine engine 140 and a fan section 160 positioned upstream thereof. The core engine 140 may generally include a substantially tubular outer casing 180 that defines an annular inlet 200. In addition, the outer casing 180 may further enclose and support a booster compressor 220 for increasing the pressure of the air that enters the core engine 140 to a first pressure level. A high pressure, multi-stage, axial-flow compressor 240 may then receive the pressurized air from the booster compressor 220 and further increase the pressure of such air. The pressurized air exiting the high-pressure compressor 240 may then flow to a combustor 26 within which fuel is injected into the flow of pressurized air, with the resulting mixture being combusted within the combustor 26. The high energy combustion products are directed from the combustor 26 along the hot gas path of the engine 100 to a first (high pressure) turbine 28 for driving the high pressure compressor 240 via a first (high pressure) drive shaft 30, and then to a second (low pressure) turbine 32 for driving the booster compressor 220 and fan section 160 via a second (low pressure) drive shaft 34 that is generally coaxial with first drive shaft 30. After driving each of turbines 28 and 32, the combustion products may be expelled from the core engine 140 via an exhaust nozzle 36 to provide propulsive jet thrust.

It should be appreciated that each turbine 28, 30 may generally include one or more turbine stages, with each stage including a turbine nozzle (not shown in FIG. 2) and a downstream turbine rotor (not shown in FIG. 2). As will be described below, the turbine nozzle may include a plurality of vanes disposed in an annular array about the centerline axis 120 of the engine 100 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 30 or 34).

Additionally, as shown in FIG. 2, the fan section 160 of the engine 100 may generally include a rotatable, axial-flow fan rotor 38 that configured to be surrounded by an annular fan casing 40. In particular embodiments, the (LP) drive shaft 34 may be connected directly to the fan rotor 38 such as in a direct-drive configuration. In alternative configurations, the (LP) drive shaft 34 may be connected to the fan rotor 38 via a speed reduction device 37 such as a reduction gear gearbox in an indirect-drive or geared-drive configuration. Such speed reduction devices may be included between any suitable shafts/spools within engine 100 as desired or required.

It should be appreciated by those of ordinary skill in the art that the fan casing 40 may be configured to be supported relative to the core engine 140 by a plurality of substantially radially-extending, circumferentially-spaced outlet guide vanes 42. As such, the fan casing 40 may enclose the fan rotor 38 and its corresponding fan rotor blades 44. Moreover, a downstream section 46 of the fan casing 40 may extend over an outer portion of the core engine 140 so as to define a secondary, or by-pass, airflow conduit 48 that provides additional propulsive jet thrust.

During operation of the engine 100, it should be appreciated that an initial air flow (indicated by arrow 50) may enter the engine 100 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 220. The pressure of the second compressed air flow 56 is then increased and enters the high pressure compressor 240 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 100. During operation, hot gases of combustion 60 may flow in an axial direction from a combustion zone of the combustor 26 into the annular, first stage turbine nozzle of the turbine 60.

Methods of forming a barrier layer that includes a breathable silicon-containing glass phase and a refractory material phase.

In one embodiment, the barrier layer is formed by first making input powders. For example, the precursors of dopant (e.g., a dopant oxide such as CaO), $SiO_2$, and $Ln_2O_3$ (e.g., $Yb_2O_3$) can be put into a suspension, then dried, and heat treated to form a powder mixture of glass and doped silicate material (e.g., doped $Ln_2Si_2O_7$, such as Ca-doped $Yb_2Si_2O_7$). Finally, the powder mixture can be milled to the appropriate particle size of input powder for a slurry process. The slurry is then formed from the input powders by combining the input powder (i.e., the powder mixture of glass and doped silicate material) with a solvent and slurry processing aids such as dispersants and binders. The slurry is then mixed (e.g., by rolling on a roller mill along with some 0.25 inch zirconia media). The substrate can be dip coated into the slurry to form a coating layer, and dried. The coating layer can then be heat treated the coating layer at a temperature between about 1260° C. and about 1565° C. to form a coating that has less than 10% porosity. The resulting coating layer (i.e., the barrier layer) is a mixture of the doped silicate material and the breathable silicon-containing glass phase.

In another embodiment, the barrier layer is formed by first making a slurry with input powders of undoped silicate material (e.g., $Ln_2Si_2O_7$, such as $Yb_2Si_2O_7$), CaO, $SiO_2$, and $Ln_2O_3$ (e.g., $Yb_2O_3$) by combining the input powders with a solvent and slurry processing aids, such as dispersants and binders. The slurry is then mixed (e.g., by rolling on a roller mill along with some 0.25 inch zirconia media). The substrate can be dip coated into the slurry to form a coating layer, and dried. The coating layer can then be heat treated the coating layer at a temperature between about 1260° C. and about 1565° C. to form a coating that has less than 10% porosity. The resulting coating layer (i.e., the barrier layer) is a mixture of the doped silicate material and the breathable silicon-containing glass phase.

In another embodiment, the barrier layer is formed by first making a slurry with input powders of undoped silicate material (e.g., $Ln_2Si_2O_7$, such as $Yb_2Si_2O_7$) and rare earth silicate glass (e.g., Ca—Si-Ln-O glass) by combining the input powders with a solvent and slurry processing aids, such as dispersants and binders. The slurry is then mixed (e.g., by rolling on a roller mill along with some 0.25 inch zirconia media). The substrate can be dip coated into the slurry to form a coating layer, and dried. The coating layer can then be heat treated the coating layer at a temperature between about 1260° C. and about 1565° C. to form a coating that has less than 10% porosity. The resulting coating layer (i.e., the barrier layer) is a mixture of the doped silicate material and the breathable silicon-containing glass phase.

In another embodiment, the barrier layer is formed by first mixing input powders of undoped silicate material (e.g., $Ln_2Si_2O_7$, such as $Yb_2Si_2O_7$) and rare earth silicate glass (e.g., Ca—Si-Ln-O glass). The input powder can then be plasma sprayed onto the substrate and heat treated to form a mixture of doped-$Ln_2Si_2O_7$ (e.g., Ca-doped $Yb_2Si_2O_7$) along with a breathable silicon-containing glass phase that is dense (e.g., having a porosity that is about 10% or less).

In another embodiment, the barrier layer is formed by first dispersing a mixture of input powders. For example, the precursors of dopant (e.g., a dopant oxide such as CaO), $SiO_2$, and $Ln_2O_3$ (e.g., $Yb_2O_3$) can be put into a suspension, then dried, and heat treated to form a powder mixture of glass and doped silicate material (e.g., doped $Ln_2Si_2O_7$, such as Ca-doped $Yb_2Si_2O_7$). Finally, the powder mixture can be spray dried to the appropriate particle size of input powder for an air plasma spray process. The input powder is plasma sprayed onto the substrate and heat treated to form a mixture of doped silicate material (e.g., doped $Ln_2Si_2O_7$, such as Ca-doped $Yb_2Si_2O_7$) along with a breathable silicon-containing glass phase that is dense (less than 10% porosity).

One advantage of taking the approach of over-doping the precursor powder, and then applying the powder(s) to the substrate is that that mixture is more thermodynamically stable (i.e., the glass and doped rare earth silicate in the powder mixture react less with one another when you get to the stage of applying the powder).

No matter its method of formation, additional layers may be applied on the barrier layer, such as layers of $Ln_2Si_2O_7$ (e.g., $Yb_2Si_2O_7$) and/or $Ln_2SiO_5$ (e.g., $Y_2SiO_5$), to protect from temperature, temperature gradient, or CMAS. Such layers would, in particular embodiments, be porous, vertically cracked, or have columnar grains to allow for escape of any carbonaceous gases (e.g., CO, $CO_2$) or nitrogen-based gases (e.g., $N_2$, NO, $NO_2$, etc.).

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. A coated substrate, comprising:
   a substrate defining a surface; and
   an environmental barrier coating on the surface of the substrate, wherein the environmental barrier coating comprises a barrier layer having a refractory material phase and a silicon-containing glass phase,
   wherein the refractory material phase comprises a rare earth component at a first atomic percent, and wherein the silicon-containing glass phase is a continuous phase and comprises the rare earth component at a second atomic percent with the second atomic percent being less than the first atomic percent.

2. The coated substrate as in claim 1, wherein the barrier layer further comprises a dopant, the dopant having a greater atomic percentage in the silicon-containing glass phase than in the refractory material phase.

3. The coated substrate as in claim 1, wherein the silicon-containing glass phase is permeable to CO gas, $CO_2$ gas, $N_2$ gas, NO gas, $NO_2$ gas, or a mixture thereof.

4. The coated substrate as in claim 1, wherein the barrier layer is directly on the surface of the substrate.

5. The coated substrate as in claim 1, wherein the silicon-containing glass phase is a continuous phase within the barrier layer, and wherein the silicon-containing glass phase comprises about 10% to about 65% of a total volume of the barrier layer.

6. The coated substrate as in claim 5, wherein the silicon-containing glass phase defines a boundary layer at the surface of the substrate, and wherein the refractory material phase includes a plurality of microcracks extending from the silicon-containing glass phase to an opposite surface of the barrier layer.

7. The coated substrate as in claim 1, wherein the silicon-containing glass phase comprises a Ca—Yb-silicate glass.

8. The coated substrate as in claim 1, wherein the barrier layer has a thickness of about 130 μm or less, and wherein the silicon-containing glass phase defines about 10% to less than 100% of the thickness of the barrier layer, and further wherein the barrier layer has a porosity of less than about 10%.

9. The coated substrate as in claim 1, wherein the barrier layer comprises $Ln_2SiO_5$ where Ln is a rare earth element or a mixture of rare earth elements doped at the Ln site with a dopant, $Ln_2Si_2O_7$ where Ln is a rare earth element or a mixture of rare earth elements doped at the Ln site with the dopant, or a mixture thereof; and wherein the dopant comprises an alkali metal cation, $Cu^{1+}$, $Au^{1+}$, $Ag^{1+}$, a noble metal cation, an alkaline earth metal cation, $Cu^{2+}$, $Ni^{2+}$, $Fe^{2+}$, $Mn^{2+}$, $Zn^{2+}$, $Sn^{2+}$, or a mixture thereof, and further wherein the dopant has a greater atomic percentage in the silicon-containing glass phase than in the refractory material phase.

10. The coated substrate as in claim 1, wherein the refractory material phase comprises a doped monosilicate compound having a formula:

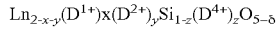
$$Ln_{2-x-y}(D^{1+})_x(D^{2+})_ySi_{1-z}(D^{4+})_zO_{5-\delta}$$

where
$D^{1+}$ is an alkali metal cation, $Cu^{1+}$, $Au^{1+}$, $Ag^{1+}$, a noble metal cation, or a mixture thereof;
$D^{2+}$ is an alkaline earth metal cation, $Cu^{2+}$, $Ni^{2+}$, $Fe^{2+}$, $Mn^{2+}$, $Zn^{2+}$, $Sn^{2+}$, or a mixture thereof;
$0 \leq x \leq 1$;
$0 \leq y \leq 1$;
$D^{4+}$ is $Sn^{4+}$, $Ge^{4+}$, $Hf^{4+}$, $Zr^{4+}$, $Ti^{4+}$, $Ce^{4+}$, or a mixture thereof;
$0 \leq z \leq 1$;
$0 \leq \delta \leq 0.2$; and
$0 < (x+y+z)$,
with the conditions:
if $y>0$ and $D^{2+}$ is an alkaline earth metal cation, then Ln is Yb, Lu, Tm or a mixture thereof; and
if not both $y>0$ and $D^{2+}$ is an alkaline earth metal cation, then Ln is a rare earth element or a mixture of rare earth elements.

11. The coated substrate as in claim 1, wherein the refractory material phase comprises a doped disilicate compound having the formula:

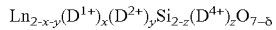
$$Ln_{2-x-y}(D^{1+})_x(D^{2+})_ySi_{2-z}(D^{4+})_zO_{7-\delta}$$

where
$D^{1+}$ is an alkali metal cation, $Cu^{1+}$, $Au^{1+}$, $Ag^{1+}$, a noble metal cation, or a mixture thereof;
$D^{2+}$ is an alkaline earth metal cation, $Cu^{2+}$, $Ni^{2+}$, $Fe^{2+}$, $Mn^{2+}$, $Zn^{2+}$, $Sn^{2+}$, or a mixture thereof;
$0 \leq x \leq 1$;
$0 \leq y \leq 1$;
$D^{4+}$ is $Sn^{4+}$, $Ge^{4+}$, $Hf^{4+}$, $Zr^{4+}$, $Ti^{4+}$, $Ce^{4+}$, or a mixture thereof;
$0 \leq z \leq 1$;
$0 \leq \delta \leq 0.2$; and
$0 < (x+y+z)$,
with the conditions:
if $y>0$ and $D^{2+}$ is an alkaline earth metal cation, then Ln is Yb, Lu, Tm or a mixture thereof; and
if not both $y>0$ and $D^{2+}$ is an alkaline earth metal cation, then Ln is a rare earth element or a mixture of rare earth elements.

12. The coated substrate as in claim 1, wherein a rare earth silicate material of the refractory material phase comprises a disilicate compound having a formula $Yb_{2-x}Ca_xSi_2O_{7-\delta}$ where $0.01 \leq x \leq 0.1$ and $0 \leq \delta \leq 0.2$, or a mixture thereof, and wherein the silicon-containing glass phase contains a higher atomic percentage of calcium than the rare earth silicate material of the refractory material phase.

13. A method of forming a barrier layer, comprising:
forming a barrier layer on a substrate, wherein the barrier layer includes a refractory material phase and a silicon-containing glass phase,
wherein the refractory material phase comprises a rare earth component at a first atomic percent, and wherein the silicon-containing glass phase is a continuous phase and comprises the rare earth component at a second atomic percent with the second atomic percent being less than the first atomic percent.

14. The method of claim 13, wherein the barrier layer is formed by:
over-doping a rare earth silicate material of a precursor powder such that a secondary breathable silicon-containing glass phase emerges in the precursor powder as a glass; and
thereafter, applying the precursor powder onto a substrate to form the barrier layer.

15. The method of claim 14, wherein the precursor powder is applied in a slurry or as a plasma spray.

* * * * *